UNITED STATES PATENT OFFICE.

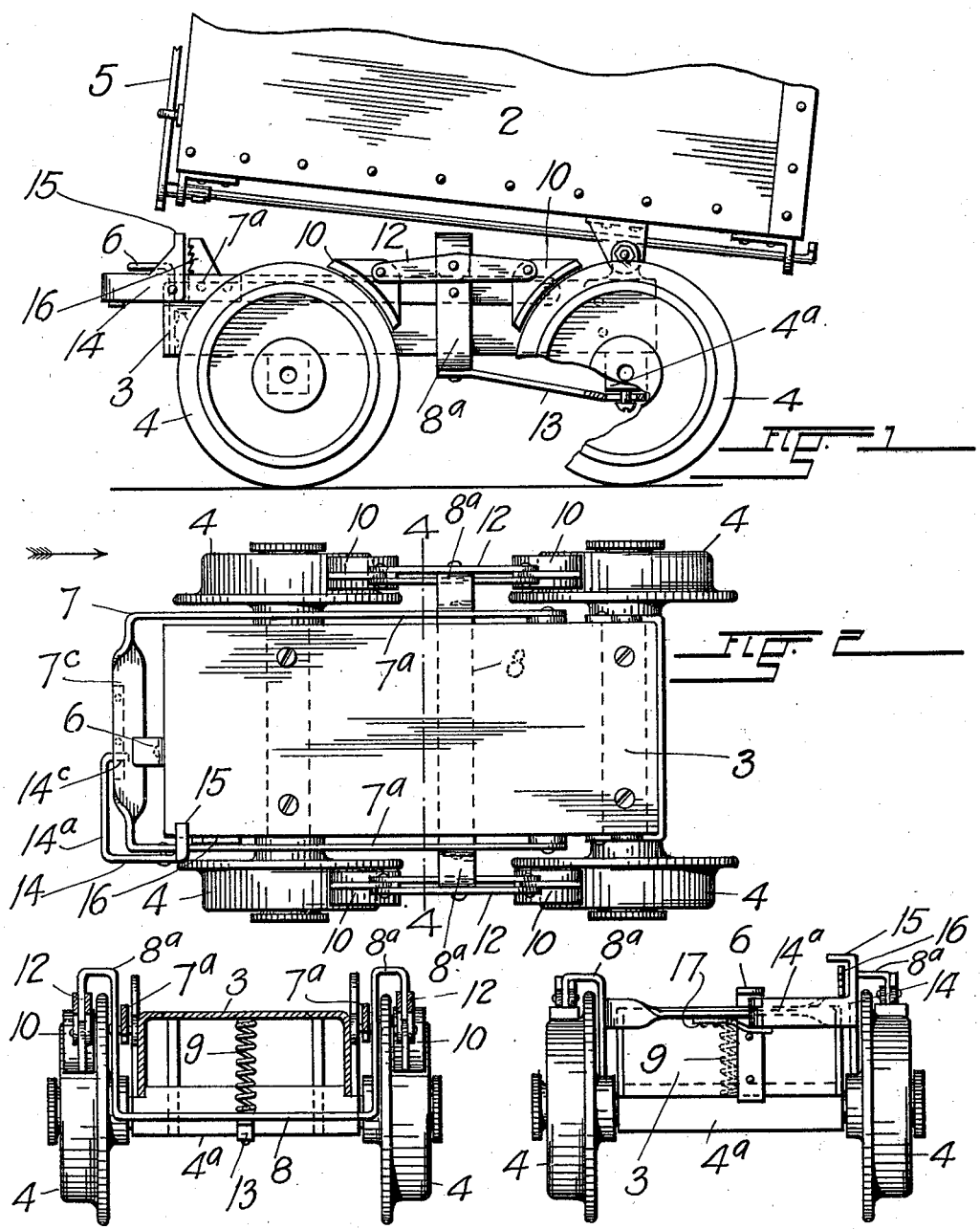

EDWARD G. LOFGREN, OF TOLLAND, COLORADO.

CAR-BRAKE.

1,000,684.  Specification of Letters Patent.  Patented Aug. 15, 1911.

Application filed November 15, 1910. Serial No. 592,558.

*To all whom it may concern:*

Be it known that I, EDWARD G. LOFGREN, a subject of Gustave V, King of Sweden, having declared my intention to become a citizen of the United States of America, residing at Tolland, in the county of Gilpin and State of Colorado, have invented certain new and useful Improvements in Car-Brakes, of which the following is a specification.

This invention relates to new and useful improvements in car-brakes and more particularly in brake mechanisms designed to be applied to ore-cars, hand-cars, gravity-cars and other conveyers whose movements are controlled by muscular action of the operator.

The principal object of my invention is to provide a brake mechanism of simple construction, which, when actuated by pressure of the foot, automatically locks the brake-blocks in frictional contact with the wheel-treads until by a similar operation, they are unlocked and returned to their normal position.

A further object of my invention resides in the provision of a mechanism which permits of placing the brake shoes above the horizontal plane of the wheel-axis.

In mines, quarries and similar workings, in which the cars to which my invention is particularly adapted, are mostly used, the tracks are generally uneven and obstructed by rocks and debris and when the brakes are applied at the lower portions of the wheels, the uneven condition of the track will often cause derailment of the car, while the dirt and rocks on the track, frequently interfere with the operation of the brake and cause breakage of the parts of which it is composed.

In the accompanying drawings, in the various views of which like parts are similarly designated, Figure 1 represents a side elevation of an ore car equipped with my improved mechanism, the upper portion of the car-body having been broken away. Fig. 2, a plan view of the truck to which the mechanism is applied. Fig. 3, an end view of the said truck looking in the direction of the arrow, Fig. 2, and Fig. 4, a vertical section taken along the line 4—4, Fig. 2.

Referring to the drawings by numerals, 2 designates the car-box which, adjacent its forward end, is pivotally mounted upon the car-truck which is composed of a suitable frame 3 and two pairs of wheels 4. The car-box 2 is held in its normal position upon the truck by means of a hand-lever 5, the lower portion of which has a detent adapted to lock with a catch 6 at the rear end of the truck-frame.

The brake mechanism consists of a double lever 7, the parallel members $7^a$ of which are connected at their rearmost ends by a cross-bar $7^c$ formed integral therewith. The members $7^a$ extend at opposite sides of the truck frame 3 to which they are fulcrumed at their forward ends, and they are pivotally attached to the upwardly projecting arms $8^a$ of a yoke 8 which constitutes the brake-beam of the mechanism and whose body portion extends below the truck frame in between the pairs of wheels upon which the latter is mounted. The body portion of the yoke is connected with a superposed part of the truck frame by a coiled spring 9 which serves to maintain the lever 7 in its uppermost position, which is determined by the engagement of the cross-bar $7^c$ with a stop on the truck, which in the construction shown, is provided by the before mentioned catch 6.

The brake blocks 10, which are disposed above the horizontal plane of the wheel-axes, are pivotally secured at opposite ends of two equalizing levers 12 which are fulcrumed upon the upper extremities of the yoke-arms $8^a$ and, when the lever 7 is in its normal uppermost position, these blocks are spaced from the wheel-treads as is shown in Fig. 1 of the drawings.

A rod 13 whose extremities are loosely connected with the body portion of the yoke 8 and one of the wheel-axles $4^a$, is provided to prevent lateral deflection of the yoke about its points of pivot on the lever 7, and to thus maintain the brake blocks at all times in their proper position relative to the respective wheels.

The device by which the lever 7 is automatically locked in its adjusted position, in which the motion of the car wheels is retarded or arrested by the frictional contact of the blocks 10, comprises a lever 14 which is fulcrumed upon one of the lever-members $7^a$ adjacent the rearmost end thereof, and which has a pawl 15 formed at one of its extremities, to engage the teeth of a ratchet-bar 16 which is rigidly secured upon the adjacent side of the truck-frame 3. The arm $14^a$ of the lever 14 opposite to that which carries the pawl 15, is bent in parallel relation to the cross-bar 7ᶜ of the lever 7 and it has a projection 14ᶜ which is engaged by the free extremity of a spring 17, the opposite end of which is secured to the said cross-bar.

When the parts comprised in the brake mechanism are in their normal position, as is illustrated in the drawings, the brake blocks 10 are disengaged from the respective wheel treads, the cross bar 7ᶜ of the lever 7 is held in engagement with the combined stop and catch 6, by the contracting action of the spring 9, and the detent 15 on the arm of the lever 14, extends above the toothed bar 16. When the operative in charge of a conveyer equipped with the improved brake mechanism, desires to arrest or retard its motion, he moves the brake-blocks simultaneously in engagement with the treads of the respective car-wheels by pressure of the foot upon the cross-bar 7ᶜ. During the consequent movement of the lever 7 about its fulcrum, the detent 15 on the lever 14 is brought in engagement with the teeth of the bar 16 and is, by the action of the spring 17, maintained in its adjusted position, to lock the lever 7 and the brake-blocks connected therewith, against retrograde movement. To release the brake, the pawl is disengaged from the toothed bar, by pressing the foot upon the bent arm 14ᵃ of the lever 14, after which the spring 9 returns the parts to their normal position.

It will be understood that changes in the arrangement and construction of the several parts comprised in the brake mechanism as shown and described, may be availed of within the spirit of the invention and that while the said mechanism is particularly adapted for use on ore-cars it may be readily applied to hand-cars and other conveyers of the same type.

Having thus described my invention what I claim and desire to secure by Letters-Patent is:—

1. A brake mechanism comprising in combination with a car-truck, a lever including members extending at opposite sides of the truck and a connecting cross-bar extending beyond one end of the same, a yoke pivotally connected with the said members and brake blocks connected with the said yoke.

2. A brake mechanism comprising in combination with a car truck, a lever including members extending at opposite sides of the truck, a yoke pivotally connected with the said members, equalizing levers fulcrumed on the said yoke, and brake blocks attached to the said equalizing levers.

3. A brake mechanism comprising in combination with a car truck, a lever including members extending at opposite sides of the truck, a yoke pivotally connected with the said members, brake blocks connected with the said yoke, and means to limit the movement of said yoke about its pivotal axis.

4. A brake mechanism comprising in combination with a car-truck, a lever including members extending at opposite sides of the truck, a yoke pivotally connected with the said members, brake-blocks connected with the said yoke, and a member loosely connecting said yoke with a relatively fixed part of the truck.

5. A brake mechanism comprising in combination with a car-truck, a lever including members extending at opposite sides of the truck, a yoke pivotally connected with the said members, brake-blocks connected with the said yoke, a stop on the truck to limit the movement of said lever in one direction, and a spring between said yoke and the truck to resiliently maintain the said lever in engagement with the said stop.

6. A brake mechanism comprising in combination with a car truck, a lever including members extending at opposite sides of the truck, a yoke pivotally connected with the said members, brake blocks connected with the said yoke, a stop on the truck to limit the movement of said lever in one direction, a spring to resiliently maintain the said lever in engagement with the said stop, a toothed bar on the truck, and a detent on the said lever, adapted to maintain it in its adjusted position by engagement with the said bar.

7. A brake mechanism comprising in combination with a car truck, a transverse member, having a vertical movement thereon, equalizing levers fulcrumed at opposite ends of the said member, brake blocks separately mounted at the ends of said levers and normally spaced from the truck-wheels above the horizontal plane of their axes, a spring for maintaining the said member in its normal position, and a lever for moving the said member downwardly against the action of the spring, whereby the blocks are brought in engagement with the respective wheels.

8. A brake mechanism comprising in combination with a car truck, brake blocks normally spaced from the wheels thereof, a lever operatively associated with said blocks and adapted to be moved by foot pressure, and a device adapted to automatically lock the parts in their adjusted position and to release the same when actuated by pressure of the foot.

In testimony whereof I affix my signature in presence of two witnesses.

EDWARD G. LOFGREN.

Witnesses:
EARL F. L. RUSSELL,
CHARLEY L. JOHNSON.